United States Patent
Sakai et al.

(10) Patent No.: US 11,024,852 B2
(45) Date of Patent: Jun. 1, 2021

(54) BINDER COMPOSITION, ELECTRODE MIXTURE, ELECTRODE, NON-AQUEOUS ELECTROLYTE SECONDARY BATTERY, AND PRODUCTION METHOD OF BINDER COMPOSITION

(71) Applicant: Kureha Corporation, Tokyo (JP)

(72) Inventors: Yuki Sakai, Chuo-ku (JP); Shintarou Kamata, Chuo-ku (JP); Emi Sugawara, Chuo-ku (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/306,175

(22) PCT Filed: May 18, 2017

(86) PCT No.: PCT/JP2017/018693
§ 371 (c)(1),
(2) Date: Nov. 30, 2018

(87) PCT Pub. No.: WO2018/008262
PCT Pub. Date: Jan. 11, 2018

(65) Prior Publication Data
US 2020/0235401 A1    Jul. 23, 2020

(30) Foreign Application Priority Data

Jul. 6, 2016   (JP) .............................. JP2016-134556

(51) Int. Cl.
*H01M 4/62*      (2006.01)
*C08F 214/22*    (2006.01)
*C08K 3/04*      (2006.01)
*H01M 4/36*      (2006.01)

(52) U.S. Cl.
CPC ......... *H01M 4/623* (2013.01); *C08F 214/225* (2013.01); *C08K 3/04* (2013.01); *H01M 4/362* (2013.01); *C08K 2201/001* (2013.01)

(58) Field of Classification Search
CPC ... H01M 4/623; H01M 4/362; C08F 214/225; C08K 3/04; C08K 2201/001
See application file for complete search history.

(56) References Cited

U.S. PATENT DOCUMENTS

| | | | |
|---|---|---|---|
| 6,077,624 A | | 6/2000 | Mitchell et al. |
| 2010/0133482 A1* | | 6/2010 | Abusleme ............ B01D 71/76 252/511 |
| 2011/0319567 A1 | | 12/2011 | Noguchi et al. |
| 2013/0273424 A1* | | 10/2013 | Watanabe ............ C09D 127/16 429/217 |
| 2013/0316234 A1 | | 11/2013 | Momose et al. |
| 2014/0120269 A1 | | 5/2014 | Abusleme et al. |
| 2015/0179996 A1* | | 6/2015 | Inaba .................... H01M 2/145 429/249 |

FOREIGN PATENT DOCUMENTS

| | | |
|---|---|---|
| CN | 100365853 C | 1/2008 |
| CN | 102282183 A | 12/2011 |
| CN | 101679563 B | 1/2012 |
| CN | 103429628 A | 12/2013 |
| CN | 104272502 A | 1/2015 |
| CN | 103261247 B | 2/2016 |
| EP | 3 285 316 A1 | 2/2018 |
| JP | 2010-525124 A | 7/2010 |
| JP | 2015151414 A | 8/2015 |
| KR | 10-2010-0016468 A | 2/2010 |
| KR | 10-2013-0109185 A | 10/2013 |
| WO | WO 2008/129041 A1 | 10/2008 |
| WO | WO2010082617 A1 | 7/2010 |
| WO | WO2012090876 A1 | 7/2012 |
| WO | WO 2014002937 * | 3/2014 |
| WO | WO 2018/092675 A1 | 5/2018 |

OTHER PUBLICATIONS

Office Action dated Jan. 28, 2020, in Japanese Patent Application No. 2018-525963.
Extended European Search Report, dated May 22, 2019, for European Application No. 17823870.5.
Translation of the International Search Report for PCT/JP2017/018693 dated Aug. 15, 2017.
Japanese Office Action and English translation dated Jun. 4, 2019, for Japanese Application No. 2018-525963.
Office Action dated Feb. 28, 2020, in Korean Patent Application No. 10-2018-7031698.
English translation of International Preliminary Report on Patentability and Written Opinion dated Jan. 17, 2019, in PCT/JP2017/018693 (Forms PCT/IB/338, PCT/IB/373, and PCT/ISA/237).
Office Action dated Sep. 25, 2020, in Korean Patent Application No. 10-2018-7031000.
Office Action dated Dec. 21, 2020, in Chinese Patent Application No. 201780025756.3.
Xin et al., "Polymer Binders for High Capacity Electrode of Lithium-Ion Battery," Progress in Chemistry (Aug. 2013), vol. 25, No. 8, pp. 1401-1410 (Abstract).
Office Action dated Dec. 11, 2020, in U.S. Appl. No. 16/305,449.

(Continued)

*Primary Examiner* — Alexander Usyatinsky
(74) *Attorney, Agent, or Firm* — Birch, Stewart, Kolasch & Birch, LLP

(57) ABSTRACT

A binder composition that exhibits sufficient adhesion and that achieves the excellent dispersibility of a conductive additive is provided. The binder composition according to an embodiment of the present invention is a binder composition including a vinylidene fluoride copolymer composition containing vinylidene fluoride and a monomer having an acidic functional group; and a ratio (Mn2/Mn1) of a number average molecular weight of the vinylidene fluoride copolymer composition after being adsorbed onto alumina (Mn2) to a number average molecular weight of the vinylidene fluoride copolymer composition before being adsorbed onto alumina (Mn1) being less than 1.

6 Claims, No Drawings

(56) References Cited

OTHER PUBLICATIONS

Office Action dated Nov. 4, 2020, in Japanese Patent Application No. 2018-525964.
Extended European Search Report dated Feb. 27, 2019, in European Patent Application No. 17823871.3.
International Preliminary Report on Patentability and Written Opinion dated Jan. 17, 2019, in PCT/JP2017/018694 (Forms PCT/IB/338, PCT/IB/373, and PCT/ISA/237).
International Search Report dated Aug. 15, 2017, in PCT/JP2017/018694.
Non-Final Office Action dated Aug. 7, 2020, in U.S. Appl. No. 16/305,449.
Office Action dated Feb. 20, 2020, in Korean Patent Application No. 10-2018-7031000.
Office Action dated Jan. 28, 2020, in Japanese Patent Application No. 2018-525964.
Office Action dated Jun. 4. 2019, in Japanese Patent Application No. 2018-525964.
Office Action dated Oct. 28, 2020, in Republic of Korea Patent application No. 10-2018-7031698.
Office Action dated Jan. 15, 2021, in Chinese Patent Application No. 201780026128.7.
Office Action dated Jan. 26, 2021, in Republic of Korea Patent Application No. 10-2018-7031698.
Office Action dated Mar. 24, 2021, in copending U.S. Appl. No. 16/305,449.

* cited by examiner

BINDER COMPOSITION, ELECTRODE MIXTURE, ELECTRODE, NON-AQUEOUS ELECTROLYTE SECONDARY BATTERY, AND PRODUCTION METHOD OF BINDER COMPOSITION

TECHNICAL FIELD

The present invention relates to a binder composition, an electrode mixture, an electrode, a non-aqueous electrolyte secondary battery, and a production method of the binder composition.

BACKGROUND ART

In recent years, there has been remarkable development in electronic technology, and the functionality of miniature mobile devices has become increasingly advanced. There is a demand for the power supplies used in these devices to be smaller and lighter, i.e. higher energy density. Non-aqueous electrolyte secondary batteries such as lithium-ion secondary batteries are widely used as a battery having high energy density.

From the perspective of global environmental problems or energy conservation, non-aqueous electrolyte secondary batteries are used in hybrid automobiles combining a secondary battery and an engine, electric automobiles having a secondary battery as a power supply, and the like, and applications thereof are expanding.

The electrode for a non-aqueous electrolyte secondary battery has a structure including a current collector and an electrode mixture layer formed on the current collector. The electrode mixture layer is formed typically by coating an electrode mixture, which includes an electrode active material, a conductive additive, and a binder composition, in the form of slurry in which the electrode mixture is dispersed in an appropriate solvent or dispersion medium, on the current collector, or by volatilizing the solvent or the dispersion medium. Compositions of vinylidene fluoride-based copolymer such as polyvinylidene fluoride (PVDF) have been primarily used as a binder composition (binding agent).

PVDF has excellent chemical resistance, weather resistance, and contamination resistance, as well as excellent electrochemical stability, mechanical properties, slurry characteristics, and the like. However, there is a problem in that the PVDF exhibits weak adhesion to a metal foil which is a current collector of a battery.

Therefore, a vinylidene fluoride-based copolymer composition has been developed as a binder material by which the adhesion is enhanced (e.g. Patent Document 1). Patent Document 1 discloses a binder for battery electrodes which includes a vinylidene fluoride-based copolymer composition having an acidic functional group.

CITATION LIST

Patent Literature

Patent Document 1: WO 2012/090876 (publication: Jul. 5, 2012)

SUMMARY OF INVENTION

Technical Problem

However, with the binder composition containing the vinylidene fluoride-based copolymer composition described in Patent Document 1, the dispersibility of the conductive additive included in the electrode mixture is not sufficient, and thus the problem of low electrical conductivity of the electrode mixture layer exists.

The present invention was completed in light of problems of conventional technologies described above, and an object of the present invention is to provide a binder composition that uses a vinylidene fluoride copolymer composition to which an acidic functional group is introduced, and that has the excellent dispersibility of a conductive additive while sufficient adhesiveness is achieved.

Solution to Problem

According to the binder composition of an embodiment of the present invention, to solve the problem described above, the binder composition includes a vinylidene fluoride copolymer composition; and the vinylidene fluoride copolymer composition includes a copolymer of vinylidene fluoride and a monomer having an acidic functional group; wherein the vinylidene fluoride copolymer composition has, in a case where the vinylidene fluoride copolymer composition is adsorbed onto alumina, a ratio (Mn2/Mn1) of less than 1, the ratio of a number average molecular weight of the vinylidene fluoride copolymer composition that is not adsorbed onto the alumina after the adsorption (Mn2) to a number average molecular weight of the vinylidene fluoride copolymer composition before the adsorption (Mn1).

To solve the problem described above, the method of producing the binder composition according to an embodiment of the present invention is a method of producing the binder composition for binding an electrode active material to a current collector, the method including performing polymerization including subjecting vinylidene fluoride and a monomer having an acidic functional group to copolymerization to produce a vinylidene fluoride copolymer composition; wherein, in the performing polymerization, the addition of the monomer having an acidic functional group is completed before a polymerization yield of the vinylidene fluoride copolymer composition exceeds 90%.

Advantageous Effects of Invention

According to the present invention, a binder composition that enhanced the dispersibility of a conductive additive while sufficient adhesiveness is achieved is provided.

DESCRIPTION OF EMBODIMENTS

An embodiment of the binder composition, the electrode mixture, the electrode and the non-aqueous electrolyte secondary battery, and the production method of the binder composition according to the present invention are described below in detail.

Binder Composition

The binder composition according to the present embodiment is a composition for binding an electrode active material to a current collector in an electrode in which an electrode mixture layer containing the electrode active material is formed on the current collector. The binder composition according to the present embodiment includes a vinylidene fluoride copolymer composition. Note that the binder composition may contain a solvent besides the vinylidene fluoride copolymer composition. The solvent may be a non-aqueous solvent or water. Examples of the non-aqueous solvent include N-methylpyrrolidone, N,N-dimethylformamide, N,N-dimethylacetamide, dimethyl sulfoxide, hexamethylphosphoramide, dioxane, tetrahydrofuran, tetramethylurea, triethyl phosphate, trimethyl phosphate, acetone, and cyclohexanone. Two or more types of these solvents may be mixed and used.

The vinylidene fluoride copolymer composition is described in detail below.

Vinylidene Fluoride Copolymer Composition

In the present embodiment, "vinylidene fluoride copolymer composition" refers to a composition containing at least a copolymer of vinylidene fluoride and a monomer having an acidic functional group. Examples of the vinylidene fluoride copolymer composition include homopolymers of vinylidene fluoride, and the compositions containing copolymers of vinylidene fluoride and a monomer having an acidic functional group. Note that the copolymer of vinylidene fluoride and a monomer having an acidic functional group may contain another monomer in addition to the vinylidene fluoride and the monomer having an acidic functional group. Furthermore, the copolymer of vinylidene fluoride and a monomer having an acidic functional group may be a copolymer obtained by subjecting vinylidene fluoride and a plurality of monomers to copolymerization. Furthermore, the vinylidene fluoride copolymer composition may contain a plurality of types of copolymers of vinylidene fluoride and a monomer having an acidic functional group, having different compositions.

In a case where the vinylidene fluoride and the monomer having an acidic functional group are copolymerized, the total amount of the monomer having an acidic functional group to be used in the polymerization is not particularly limited; however, the total amount is preferably from 0.05 to 5 parts by mass, more preferably from 0.1 to 3 parts by mass, and even more preferably from 0.3 to 2 parts by mass, per 100 parts by mass of the vinylidene fluoride.

The vinylidene fluoride copolymer of the vinylidene fluoride and the monomer having an acidic functional group according to the present embodiment preferably has from 99.95 to 95 mol %, more preferably from 99.92 to 96.5 mol %, and particularly preferably from 99.9 to 98 mol % of constituent unit derived from the vinylidene fluoride (where the total of the constituent unit derived from the vinylidene fluoride and the constituent unit derived from the monomer having an acidic functional group is 100 mol %). Furthermore, the vinylidene fluoride copolymer of the vinylidene fluoride and the monomer having an acidic functional group according to the present embodiment preferably includes from 0.05 to 5 mol %, more preferably from 0.08 to 3.5 mol %, and particularly preferably from 0.1 to 2 mol % of the constituent unit derived from the monomer having an acidic functional group.

The inherent viscosity of the vinylidene fluoride copolymer composition according to the present embodiment is not particularly limited; however, the inherent viscosity is preferably from 1 dL/g to 5 dL/g, more preferably from 1.5 dL/g to 4 dL/g, and even more preferably from 1.7 dL/g to 3.5 dL/g. In a case where the inherent viscosity is 1 dL/g or greater, the even better adhesiveness of the binder composition is achieved. Furthermore, in a case where the inherent viscosity is 5 dL/g or less, the decrease in the slurry solid content is further suppressed, and even better productivity is achieved.

Monomer Having Acidic Functional Group

Examples of the acidic functional group included in the monomer include a carboxy group, a phosphonic acid group, a sulfonic acid group, and a phenolic hydroxy group. Among these, a carboxy group is preferable. In a case where the monomer has a carboxy group, the carboxy group is a functional group that has adhesiveness to metal, and even better adhesiveness to a metal foil, which is a current collector of a battery, of the binder composition is achieved.

Note that the number of the acidic functional group included in the monomer is not particularly limited, and one monomer may contain a plurality of acidic functional groups, or one monomer may contain a plurality of types of acidic functional groups.

Examples of the monomer having a carboxy group as the acidic functional group include compounds represented by Formula (1) below.

[Chemical Formula 1]

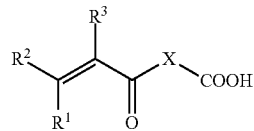

(1)

where $R^1$, $R^2$, and $R^3$ are each independently a hydrogen atom, a fluorine atom, a chlorine atom, or an alkyl group having from 1 to 3 carbons, and X is an atomic group having a main chain formed from 1 to 10 atoms and having a molecular weight of 500 or less and includes at least one heteroatom selected from the group consisting of an oxygen atom and a nitrogen atom.

$R^1$, $R^2$, and $R^3$ in the compound represented by Formula (1) are each independently a hydrogen atom, a fluorine atom, a chlorine atom, or an alkyl group having from 1 to 3 carbons. Examples of the alkyl group having from 1 to 3 carbons include a methyl group, an ethyl group, a propyl group, and an isopropyl group. Among these, $R^1$ is preferably a hydrogen atom or a methyl group, and more preferably a hydrogen atom. $R^2$ is preferably a hydrogen atom or a methyl group, and more preferably a hydrogen atom. $R^3$ is preferably a hydrogen atom, a fluorine atom, or a methyl group, and more preferably a hydrogen atom.

The main chain constituting X in the compound represented by Formula (1) has from 1 to 10 atoms, preferably from 2 to 8 atoms, and more preferably from 2 to 7 atoms. Examples of the atom constituting the main chain include a carbon atom and heteroatoms described below. Note that the number of atoms of hydrogen atoms is not included in the number of atoms in the main chain. Furthermore, the number of atoms in the main chain refers to the number of atoms of a backbone portion of the chain that connects the carboxyl group indicated on the right side of X with the group indicated on the left side of X ($R^1R^2C=CR^3$—CO—) by the least number of atoms.

The molecular weight of the atomic group of X in the compound represented by Formula (1) is 500 or less, preferably 300 or less, and more preferably 200 or less. The lower limit of the molecular weight in the case of the atomic group is not particularly limited but is typically 15.

Furthermore, X includes at least one heteroatom selected from the group consisting of an oxygen atom and a nitrogen atom. The atomic group described above may contain at least one heteroatom and may contain a plurality of heteroatoms. From the perspective of copolymerization with the vinylidene fluoride, the heteroatom is preferably an oxygen atom. Note that the heteroatom may be included in both the main chain and a side chain of the atomic group or may be included in either one of these. Furthermore, one or more carboxyl group may be included in a side chain of the atomic group.

The compound represented by Formula (1) is preferably a compound represented by Formula (2) below.

[Chemical Formula 2]

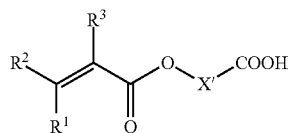

(2)

where $R^1$, $R^2$, and $R^3$ are each independently a hydrogen atom, a fluorine atom, a chlorine atom, or an alkyl group having from 1 to 3 carbons, and X' is an atomic group having a main chain formed from 1 to 9 atoms and having a molecular weight of 484 or less.

$R^1$, $R^2$, and $R^3$ in the compound represented by Formula (2) are each independently a hydrogen atom, a fluorine atom, a chlorine atom, or an alkyl group having from 1 to 3 carbons. Examples of the alkyl group having from 1 to 3 carbons include a methyl group, an ethyl group, a propyl group, and an isopropyl group. Among these, $R_1$ is preferably a hydrogen atom or a methyl group, and more preferably a hydrogen atom. $R^2$ is preferably a hydrogen atom or a methyl group, and more preferably a hydrogen atom. $R^3$ is preferably a hydrogen atom, a fluorine atom, or a methyl group, and more preferably a hydrogen atom.

The main chain constituting X' in the compound represented by Formula (2) has from 1 to 9 atoms, preferably from 1 to 7 atoms, and more preferably from 1 to 6 atoms. Examples of the atom constituting the main chain include a carbon atom and heteroatoms described below. Note that the number of atoms of hydrogen atoms is not included in the number of atoms in the main chain. Furthermore, the number of atoms in the main chain refers to the number of atoms of a backbone portion of the chain that connects the carboxyl group indicated on the right side of X' with the group indicated on the left side of X' ($R^1R^2C$=$CR^3$—CO—O—) by the least number of atoms.

The molecular weight of the atomic group of X' in the compound represented by Formula (2) is 484 or less, preferably 284 or less, and more preferably 184 or less. Furthermore, the lower limit of the molecular weight in the case of the atomic group is not particularly limited but is typically 14.

Furthermore, X' includes at least one heteroatom selected from the group consisting of an oxygen atom and a nitrogen atom and may contain a plurality of heteroatoms. Note that the heteroatom may be included in both the main chain and a side chain of the atomic group or may be included in either one of these.

The compound represented by Formula (1) is more preferably at least one type selected from the group consisting of (a) 2-carboxyethyl acrylate, (b) acryloyloxyethyl succinate, and (c) acryloyloxypropyl succinate, from the perspective of adhesiveness to a metal foil. The structural formulas of these compounds are shown below.

[Chemical Formula 3]

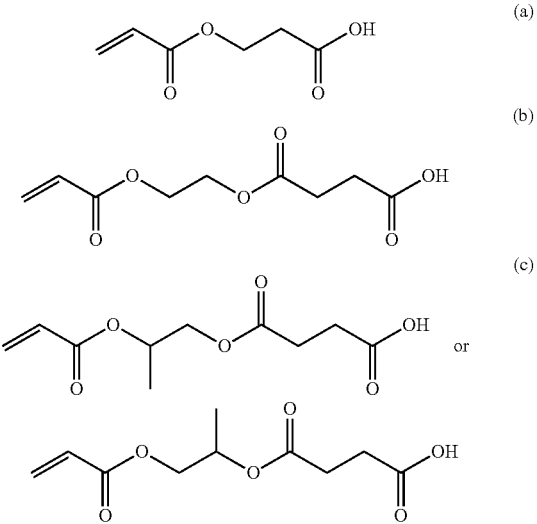

Other Monomers

Examples of other monomer that may be included in the copolymer of the vinylidene fluoride and the monomer having an acidic functional group include fluorine-based monomers and hydrocarbon-based monomers, such as ethylene and propylene, which are copolymerizable with vinylidene fluoride, and monomers which are copolymerizable with the compound of Formula (1). Examples of fluorine-based monomers which are copolymerizable with vinylidene fluoride include vinyl fluoride, trifluoroethylene, tetrafluoroethylene, chlorotrifluoroethylene, hexafluoropropylene, and perfluoroalkyl vinyl ethers represented by perfluoromethyl vinyl ether. Examples of monomers which are copolymerizable with the compound of Formula (1) include (meth)acrylic acid or alkyl (meth)acrylate compounds represented by methyl(meth)acrylate. Note that one type of these other monomers may be used alone, or two or more types thereof may be used.

In a case where other monomer(s) is included in the copolymer of the vinylidene fluoride and the monomer having an acidic functional group, the total amount of such other monomer(s) to be used in the polymerization is not particularly limited; however, the total amount is preferably from 0.01 to 30 parts by mass, more preferably from 0.05 to 20 parts by mass, and even more preferably from 0.1 to 10 parts by mass, per 100 parts by mass of the vinylidene fluoride.

Number Average Molecular Weight Ratio

The number average molecular weight ratio in the vinylidene fluoride copolymer composition according to the present embodiment is described below.

The number average molecular weight ratio of the vinylidene fluoride copolymer composition is, upon adsorption of the vinylidene fluoride copolymer composition onto alumina, a ratio (Mn2/Mn1) of the number average molecular weight of the vinylidene fluoride copolymer composition that was not adsorbed onto the alumina after the adsorption of the vinylidene fluoride copolymer composition onto the alumina (Mn2) to the number average molecular weight of the vinylidene fluoride copolymer composition before the adsorption of the vinylidene fluoride copolymer composition onto the alumina (Mn1). The number average molecular weight ratio (Mn2/Mn1) of the vinylidene fluoride copolymer composition according to the present embodiment is less than 1. The number average molecular weight ratio (Mn2/Mn1) of the vinylidene fluoride copolymer composition according to the present embodiment is preferably 0.95 or less, and more preferably 0.9 or less.

Note that, upon adsorption of the vinylidene fluoride copolymer composition onto alumina, the copolymer of the monomer having an acidic functional group and the vinylidene fluoride is preferentially adsorbed onto the alumina among the polymers included in the vinylidene fluoride copolymer composition. That is, Mn2 is the number average molecular weight of the rest of the polymer that was not adsorbed onto the alumina. Examples of the rest of the polymer include the copolymer of the vinylidene fluoride and the monomer having an acidic functional group that was not adsorbed onto the alumina, and other polymers included in the vinylidene fluoride copolymer composition. Examples of such other polymers include homopolymers of the vinylidene fluoride.

The Mn2/Mn1 of less than 1 indicates that, upon adsorption of the vinylidene fluoride copolymer composition onto the alumina, the number average molecular weight of Mn2 became smaller than the number average molecular weight of Mn1, i.e. the number average molecular weight of the copolymer of the monomer having an acidic functional group and the vinylidene fluoride, which was adsorbed, was in a high molecular weight region of the vinylidene fluoride copolymer composition.

The number average molecular weight ratio Mn2/Mn1 of the vinylidene fluoride copolymer composition according to the present embodiment is less than 1, and thus the vinylidene fluoride copolymer having the acidic functional group has a biased distribution toward the high molecular weight in the molecular weight distribution of the vinylidene fluoride copolymer composition according to the present embodiment. The adsorption rate of the polymer to the solid surface is considered to be faster for a low molecular weight substance, and thus a low molecular weight polymer in which no acidic functional group is introduced or which has less amount of introduced acidic functional group is adsorbed faster to the conductive additive. Therefore, the binding of high molecular weight polymer having a large number of acidic functional groups to the conductive additive is inhibited, and thus the dispersibility of the conductive additive is enhanced. Furthermore, the enhancement of the dispersibility of the conductive additive reduces the volume resistance of an electrode, and enhances the electrical conductivity of the electrode. Note that, in a case where Mn2/Mn1 is greater than 1, the dispersibility of the conductive additive is reduced, and the volume resistance of the electrode is increased.

The number average molecular weight ratio in the vinylidene fluoride copolymer composition according to the present embodiment is estimated by the following method.

First, a 0.1% binder composition-NMP solution is prepared. While this solution is agitated, alumina (e.g. AKP 3000) is added gradually. After adding the alumina, the mixture is agitated for a certain time period and then allowed to stand still. The supernatant is subjected to centrifugal separation. The supernatant after the centrifugal separation and the 0.1% binder composition-NMP solution before the alumina addition are subjected to GPC analysis to calculate each of the molecular weights. The number average molecular weight of the vinylidene fluoride copolymer composition before addition to the alumina is used as Mn1, and the number average molecular weight of the vinylidene fluoride copolymer composition that was not adsorbed onto the alumina after addition to the alumina is used as Mn2, and the number average molecular weight ratio (Mn2/Mn1), which is the ratio of Mn2 to Mn1, is then determined. The amount of the alumina to be added also depends on the specific surface area of the alumina to be used and the like, cannot be decided unequivocally, and is preferably adjusted to a degree where 60% or greater is adsorbed after the adsorption compared to the before the adsorption, i.e. the area of the chromatogram of the vinylidene fluoride copolymer composition after the adsorption is smaller by at least 60% compared to the area of the chromatogram of the vinylidene fluoride copolymer composition before the adsorption.

Furthermore, in general, the use of a high molecular weight binder composition can achieve high adhesiveness, and thus the distribution of the acidic functional group biased toward the high molecular weight region efficiently contributes to the exhibition of adhesiveness of the acidic functional group. Thus, the binder composition according to an embodiment of the present invention can achieve the effect of exhibiting the excellent dispersibility of the conductive additive while sufficient adhesiveness is achieved.

Production Method of Binder Composition

The production method of the binder composition is not particularly limited but, in an example, includes performing polymerization including subjecting vinylidene fluoride and a monomer having an acidic functional group to copolymerization to produce a vinylidene fluoride copolymer composition.

The polymerization method of the vinylidene fluoride copolymer in the performing polymerization is not particularly limited, and a known polymerization method can be used. Examples of the polymerization method include suspension polymerization, emulsion polymerization, and solution polymerization; however, among these, from the perspective of ease in post-treatment or the like, suspension polymerization and emulsion polymerization in an aqueous system are preferable, and suspension polymerization in an aqueous system is particularly preferable.

Suspension Polymerization

Suspension polymerization is a method of dissolving an oil-soluble polymerization initiator in a water-insoluble monomer in water containing a stabilizer or the like, suspending and dispersing the mixture by mechanical stirring, and heating the mixture to perform polymerization in the monomer droplets. In the suspension polymerization, the polymerization proceeds in the monomer droplets, and thus a dispersed solution of binder composition fine particles can be obtained. In the suspension polymerization, in addition to the monomer used for the polymerization of the vinylidene fluoride copolymer, a dispersion medium, a suspending agent, and a polymerization initiator are used.

Dispersion Medium

The dispersion medium that can be used is not particularly limited, and a known dispersion medium can be used; however, water is preferable as the dispersion medium.

Suspending Agent

The suspending agent that can be used is not particularly limited, and a known suspending agent can be used. Examples of the suspending agent include methylcellulose, methoxylated methylcellulose, propoxylated methylcellulose, hydroxyethyl cellulose, hydroxypropyl cellulose, polyvinyl alcohol, polyethylene oxide, and gelatin.

The added amount of the suspending agent is preferably from 0.005 to 1.0 part by mass, and more preferably from 0.01 to 0.4 parts by mass, per 100 parts by mass total of all the monomers used in the copolymerization.

Polymerization Initiator

The polymerization initiator that can be used is not particularly limited, and a known polymerization initiator can be used. Examples of polymerization initiator include diisopropyl peroxydicarbonate, dinormal propyl peroxydicarbonate, dinormal heptafluoropropyl peroxydicarbonate, isobutyl peroxide, di(chlorofluoroacyl)peroxide, di(perfluoroacyl)peroxide, and t-butyl peroxypivalate.

The added amount of the polymerization initiator is preferably from 0.05 to 5 parts by mass, and more preferably from 0.15 to 2 parts by mass, per 100 parts by mass total of all the monomers used in the copolymerization.

Other Components

In the suspension polymerization, a chain transfer agent may be used to adjust the degree of polymerization of the obtained vinylidene fluoride copolymer. Examples of the chain transfer agent include ethyl acetate, methyl acetate, diethyl carbonate, acetone, ethanol, n-propanol, acetaldehyde, propylaldehyde, ethyl propionate, and carbon tetrachloride.

In a case where a chain transfer agent is used, the added amount of the chain transfer agent is preferably from 0.1 to 5 parts by mass, and more preferably from 0.5 to 3 parts by mass, per 100 parts by mass total of all the monomers used in the copolymerization.

Furthermore, a buffer solution may be used as necessary. The buffer solution that can be used is not particularly limited, and a known buffer solution can be used. Examples of the buffer solution include citrate buffer solutions, phosphate buffer solutions, citrate-phosphate buffer solutions, acetate buffer solutions, borate buffer solutions, and tris buffer solutions. In a case where a buffer solution is used, the amount of the buffer agent constituting the buffer solution is preferably from 0.01 to 5 parts by mass, and preferably from 0.1 to 3 parts by mass, per 100 parts by mass total of all the monomers used in the copolymerization.

Polymerization Condition

The polymerization temperature T is selected as appropriate according to the 10-hour half-life temperature $T_{10}$ of the polymerization initiator, and is normally selected in the range of $T_{10}-20°$ C.$\leq$T$\leq T_{10}+20°$ C. For example, $T_{10}$ of t-butyl peroxypivalate and diisopropyl peroxydicarbonate are 54.6° C. and 40.5° C., respectively (see product catalog of NOF Corporation). Therefore, in polymerization using t-butyl peroxypivalate or diisopropyl peroxydicarbonate as a polymerization initiator, the polymerization temperature T is selected as appropriate in the range of 34.6° C.$\leq$T$\leq$74.6° C. and 20.5° C.$\leq$T$\leq$60.5° C., respectively.

The polymerization is typically performed under increased pressure, and preferably from 3 to 15 MPa-G.

The polymerization time is not particularly limited, but not longer than 100 hours is preferred from the perspective of productivity.

In the performing polymerization, the addition of the monomer having an acidic functional group is completed preferably before a polymerization yield of the vinylidene fluoride copolymer composition exceeds 90%, more preferably 80% or less, and even more preferably 70% or less. Setting the timing for the completion of addition of the monomer having an acidic functional group to the range described above can make a distribution of the vinylidene fluoride copolymer having the acidic functional group toward the high molecular weight region in the molecular weight distribution of the vinylidene fluoride copolymer composition. Note that, for the polymerization yield described above in the present embodiment, the case where the total amount of the monomers used in the performing polymerization is polymerized is defined as 100%.

Electrode Mixture

The electrode mixture according to the present embodiment includes the binder composition according to the present embodiment, an electrode active material, and a conductive additive. Furthermore, to adjust the viscosity of the electrode mixture, as necessary, a solvent or a dispersion medium may be added as appropriate. An electrode can be produced by forming an electrode mixture layer by coating this electrode mixture onto a current collector.

Electrode Active Material

The electrode active material used in the electrode mixture of the present embodiment is not particularly limited and, for example, a known electrode active material for negative electrodes (negative electrode active material) or electrode active material for positive electrodes (positive electrode active material) can be used. Examples of the negative electrode active material include carbon materials, metal/alloy materials, and metal oxides. Among these, carbon materials are preferable. In a case where such a carbon material is used, even higher energy density of the battery can be achieved. A lithium-based positive electrode active material containing at least lithium is preferable as a positive electrode active material. Examples of lithium-based positive electrode active materials include a composite metal chalcogen compound represented by the general formula $LiMY_2$ (M is at least one type of transition metals such as Co, Ni, Fe, Mn, Cr, or V; and Y is a chalcogen element such as O or S) such as $LiCoO_2$ or $LiNi_xCo_{1-x}O_2$ ($0 \leq x \leq 1$), a composite metal oxide having a spinel structure such as $LiMn_2O_4$, and an olivine-type lithium compound such as $LiFePO_4$.

Conductive Additive

The conductive additive used in the electrode mixture of the present embodiment is not particularly limited and, for example, known conductive additives, such as carbon black, carbon fibers, and carbon nanotubes, can be used.

Other Components of Electrode Mixture

The electrode mixture of the present embodiment may contain another component besides the components described above. Examples of such another component include pigment dispersant such as polyvinylpyrrolidone, and the like.

Composition

In the electrode mixture according to the present embodiment, the binder composition is preferably included in an amount of 0.1 to 10 parts by mass, and more preferably from 0.3 to 6 parts by mass, per 100 parts by mass total of the binder composition and the electrode active material. Furthermore, the electrode active material is preferably included in an amount of 90 to 99.9 parts by mass, and more preferably from 94 to 99.7 parts by mass. The content of the conductive additive is preferably from 0.1 to 10 parts by mass, more preferably from 0.3 to 5 parts by mass, and even more preferably from 0.5 to 3 parts by mass, per 100 parts by mass total of the binder composition, the electrode active material, and the conductive additive.

Production Method of Electrode Mixture

The production method of the electrode mixture according to the present embodiment may include mixing the binder composition, the electrode active material, and the conductive additive to form a uniform slurry, and the order of the mixing is not particularly limited. Furthermore, in a case where the binder composition includes a solvent, the electrode active material or the like may be added before the solvent is added to the vinylidene fluoride copolymer composition.

For example, the electrode active material and the solvent may be added to the vinylidene fluoride copolymer composition and agitated and mixed to obtain the electrode mixture. Furthermore, the electrode active material may be dispersed in the solvent, and then the binder composition may be added thereto and agitated and mixed to obtain the electrode mixture.

Electrode

The electrode according to the present embodiment has a structure in which a layer formed from the electrode mixture according to the present embodiment is provided on a current collector. The electrode mixture layer may be formed on at least one face of the current collector and is preferably formed on the both faces of the current collector.

Current Collector

The current collector is a base material of an electrode and a terminal to take electricity out. The material of the current collector is not particularly limited, and a known material, such as aluminum or copper, can be used.

The thickness of the current collector is not particularly limited and is preferably from 5 to 100 µm, and more preferably from 5 to 20 µm.

Electrode Mixture Layer

The electrode mixture layer is a layer obtained by coating and drying the electrode mixture described above onto the current collector. The coating method of the electrode mixture is not particularly limited, and examples thereof include methods of coating by using a bar coater, a die coater, or a comma coater.

The thickness of the electrode mixture layer is not particularly limited but is typically from 20 to 250 µm, and preferably from 20 to 150 µm. Furthermore, the coating weight of the electrode mixture layer is not particularly limited but is typically from 20 to 700 g/m², and preferably from 30 to 500 g/m².

The drying temperature and the drying time to form the electrode mixture layer are typically at a temperature of 50 to 150° C. for 1 to 300 minutes. The pressure at the time of drying is not particularly limited but drying is ordinarily performed under atmospheric pressure or reduced pressure.

Furthermore, press treatment may be performed. In the case where the press treatment is performed, the pressure is typically from 1 to 200 MPa-G.

Non-Aqueous Electrolyte Secondary Battery

The non-aqueous electrolyte secondary battery according to the present embodiment has the electrode according to the present embodiment. The non-aqueous electrolyte secondary battery according to the present embodiment may include a polymer battery containing a gel electrolyte and the like. Other components (e.g. separator) in the non-aqueous electrolyte secondary battery are not particularly limited and used components may be used.

Summary

According to the binder composition of an embodiment of the present invention, the binder composition contains a vinylidene fluoride copolymer composition; and the vinylidene fluoride copolymer composition contains a copolymer of vinylidene fluoride and a monomer having an acidic functional group; wherein the vinylidene fluoride copolymer composition has, in a case where the vinylidene fluoride copolymer composition is adsorbed onto alumina, a ratio (Mn2/Mn1) of less than 1, the ratio of a number average molecular weight of the vinylidene fluoride copolymer composition that was not adsorbed onto the alumina after the adsorption (Mn2) to a number average molecular weight of the vinylidene fluoride copolymer composition before the adsorption (Mn1).

Furthermore, in the binder composition of an embodiment of the present invention, the acidic functional group is preferably a carboxy group.

Furthermore, in the binder composition of an embodiment of the present invention, the monomer having an acidic functional group is preferably a compound represented by Formula (1) below.

[Chemical Formula 4]

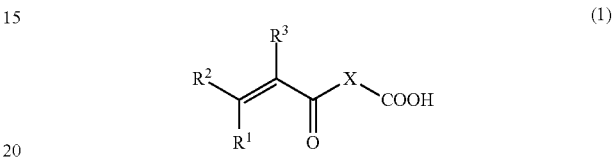

(1)

where $R^1$, $R^2$, and $R^3$ are each independently a hydrogen atom, a fluorine atom, a chlorine atom, or an alkyl group having from 1 to 3 carbons, and X is an atomic group having a main chain formed from 1 to 10 atoms and having a molecular weight of 500 or less and includes at least one heteroatom selected from the group consisting of an oxygen atom and a nitrogen atom.

Furthermore, the binder composition according to an embodiment of the present invention, the monomer having an acidic functional group is preferably at least one type selected from the group consisting of 2-carboxyethyl acrylate, acryloyloxyethyl succinate, and acryloyloxypropyl succinate.

Furthermore, an electrode mixture containing the binder composition according to an embodiment of the present invention, an electrode active material, and a conductive additive is also included in the present invention.

Furthermore, an electrode in which a layer formed from the electrode mixture according to an embodiment of the present invention is provided on a current collector, and a non-aqueous electrolyte secondary battery having the electrode are also included in the present invention.

The production method of the binder composition according to an embodiment of the present invention is a production method of the binder composition for binding an electrode active material to a current collector, the method including performing polymerization including subjecting vinylidene fluoride and a monomer having an acidic functional group to copolymerization to produce a vinylidene fluoride copolymer composition; in the performing polymerization, the addition of the monomer having an acidic functional group being completed before a polymerization yield of the vinylidene fluoride copolymer composition exceeds 90%.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

As described below, electrodes were produced by using various binder compositions according to embodiments of the present invention, and a peeling test and volume resistivity measurement were performed by using these. Note that, before examples are specifically described, the calculation methods of "inherent viscosity" and "absorbance ratio" in the present specification are described below.

Inherent Viscosity $\eta_i$

To calculate the inherent viscosity $\eta_i$, 80 mg of vinylidene fluoride copolymer composition is dissolved in 20 mL of N,N-dimethylformamide to prepare a polymer solution. The viscosity $\eta$ of this polymer solution is measured by using an Ubbelohde viscometer in a thermostatic chamber at 30° C. The inherent viscosity $\eta_i$ is determined by the following equation by using the viscosity $\eta$.

$$\eta_i = (1/C) \cdot \ln(\eta/\eta_0)$$

where $\eta_0$ is the viscosity of the N,N-dimethylformamide, which is the solvent, and C is 0.4 g/dL.

Absorbance Ratio $A_R$

To determine the absorbance ratio $A_R$, a vinylidene fluoride copolymer composition is heat-pressed at 230° C. to prepare a 30 mm×30 mm pressed sheet. The IR spectrum of the prepared pressed sheet is measured in the range from 1500 cm$^{-1}$ to 4000 cm$^{-1}$ by using the infrared spectrophotometer FT-730 (available from Horiba, Ltd.). The absorbance ratio $A_R$ is determined by the following equation.

$$A_R = A_{1700\text{-}1800}/A_{3023}$$

where $A_{1700\text{-}1800}$ is the absorbance originating from stretching vibration of carbonyl groups detected in the range of 1700 to 1800 cm$^{-1}$, and $A_{3023}$ is the absorbance originating from stretching vibration of CH detected near 3023 cm$^{-1}$.

Example 1

Preparation of Binder Composition

In an autoclave having a capacity of 2 L, 1000 g of ion-exchanged water as a dispersion medium, 0.6 g of Metolose SM-100 (available from Shin-Etsu Chemical Co., Ltd.) as a cellulose-based suspending agent, 2.8 g of a 50 wt. % diisopropyl peroxydicarbonate-HCFC-225cb solution as a polymerization initiator, 2.8 g of ethyl acetate as a chain transfer agent, 400 g of vinylidene fluoride, and 0.2 g of acryloyloxyethyl succinate as a monomer were charged, and the temperature thereof was increased to 25° C. over 1 hour.

Thereafter, while the temperature of 25° C. was maintained, 10 wt. % acryloyloxyethyl succinate aqueous solution was gradually added at the rate of 0.044 g/min over 14.4 hours. A total of 4.0 g of acryloyloxyethyl succinate was added, including the amount added initially. After the completion of the addition of the acryloyloxyethyl succinate aqueous solution, the temperature was increased to 40° C., and the polymerization was terminated at the time when the internal pressure reached 1.5 MPa-G.

After the polymerization was terminated, the polymer slurry was heat-treated at 95° C. for 60 minutes. The polymer slurry was then dehydrated, washed with water, and dried at 80° C. for 20 hours to produce a binder composition (vinylidene fluoride copolymer composition). The yield of the obtained polymer was 92%, the inherent viscosity $\eta_i$ was 1.87 dL/g, and the absorbance ratio $A_R$ was 0.52.

Production of Electrode Mixture

In a cup made from polyethylene, the binder composition, N-methyl-2-pyrrolidone (NMP), and ketjen black (Carbon ECP, available from Lion Specialty Chemicals Co., Ltd.) as a conductive additive were added and mixed by AR-310, available from Thinky Corporation, (1500 rpm, 1 minute) to allow the mixture to be a paste. To this, an electrode active material (lithium cobaltate, CELLSEED C5H, available from Nippon Chemical Industrial Co., Ltd.) and, as necessary, NMP were added and mixed (1500 rpm, 2 minutes). Furthermore, NMP was added to adjust the viscosity to a viscosity that enables coating and mixed (1500 rpm, 2 minutes) to prepare an electrode mixture (mixing A).

Note that the added amount (part) of the binder composition was 2 parts per 100 parts of the electrode active material. Furthermore, the added amount (part) of the conductive additive was 0.5 parts per 100 parts of the electrode active material. That is, electrode active material/conductive additive/binder composition=100/0.5/2.

Production of Electrode

The obtained electrode mixture was coated by a bar coater on an aluminum foil having a thickness of 15 μm which served as a current collector and was dried in a nitrogen atmosphere at 110° C. for 30 minutes by using a thermostatic chamber to produce an electrode with one-side coating having a coating weight of the one side of 200 g/m$^2$.

Example 2

Preparation of Binder Composition

In an autoclave having a capacity of 2 L, 1000 g of ion-exchanged water as a dispersion medium, 0.4 g of Metolose SM-100 (available from Shin-Etsu Chemical Co., Ltd.) as a cellulose-based suspending agent, 2.0 g of a 50 wt. % diisopropyl peroxydicarbonate-HCFC-225cb solution as a polymerization initiator, 1.1 g of ethyl acetate as a chain transfer agent, 400 g of vinylidene fluoride, and 0.2 g of acryloyloxypropyl succinate as a monomer were charged, and the temperature thereof was increased to 25° C. over 1 hour.

Thereafter, while the temperature of 25° C. was maintained, 5 wt. % acryloyloxypropyl succinate aqueous solution was gradually added at the rate of 0.068 g/min over 20 hours. A total of 5.2 g of acryloyloxypropyl succinate was added, including the amount added initially. After the completion of the addition of the acryloyloxypropyl succinate aqueous solution, the temperature was increased to 40° C., and the polymerization was terminated at the time when the internal pressure reached 1.5 MPa-G.

After the polymerization was terminated, the polymer slurry was heat-treated at 95° C. for 60 minutes. The polymer slurry was then dehydrated, washed with water, and dried at 80° C. for 20 hours to obtain a binder composition. The yield of the obtained polymer was 92%, the inherent viscosity $\eta_i$ was 2.50 dL/g, and the absorbance ratio $A_R$ was 0.57.

Production of Electrode Mixture

The electrode mixture was produced by the same method as in Example 1 except for changing the added amount of the binder composition to 1 part.

Production of Electrode

The electrode was produced by the same method as in Example 1.

Example 3

Preparation of Binder Composition

The binder composition was obtained by the same method as in Example 2.

Production of Electrode Mixture

In a cup made from polyethylene, an electrode active material (lithium cobaltate, CELLSEED C-10, available from Nippon Chemical Industrial Co., Ltd.) and ketjen black (Carbon ECP, available from Lion Specialty Chemicals Co., Ltd.) as a conductive additive were added and mixed by AR-310, available from Thinky Corporation, (1500 rpm, 1 minute). To this, the binder composition was added and mixed (1500 rpm, 2 minutes). Furthermore, NMP was added to adjust the viscosity to a viscosity that enables coating, and mixed (1500 rpm, 2 minutes) to prepare an electrode mixture (mixing B).

Note that the added amount (part) of the binder composition was 2 parts per 100 parts of the electrode active material. Furthermore, the added amount (part) of the conductive additive was 0.5 parts per 100 parts of the electrode active material. That is, electrode active material/conductive additive/binder composition=100/0.5/2.

Production of Electrode

The electrode was produced by the same method as in Example 1.

Comparative Example 1

Preparation of Binder Composition

In an autoclave having a capacity of 2 L, 900 g of ion-exchanged water as a dispersion medium, 0.4 g of Metolose 90SH-100 (available from Shin-Etsu Chemical Co., Ltd.) as a cellulose-based suspending agent, 8.4 g of a 50 wt. % t-butyl peroxypivalate-HCFC-225cb solution as a polymerization initiator, 400 g of vinylidene fluoride, and 0.2 g of acryloyloxyethyl succinate as a monomer were charged, and the temperature thereof was increased to 50° C. over 2 hours.

Thereafter, while the temperature of 50° C. was maintained, 0.65 wt. % acryloyloxyethyl succinate aqueous solution was gradually added at the rate that makes the polymerization pressure constant. A total of 3.4 g of acryloyloxyethyl succinate was added, including the amount added initially. Polymerization was terminated at the same time when the addition of acryloyloxyethyl succinate aqueous solution was ended, and the time took from the start of heating to the termination of the polymerization was 6.3 hours total.

After the polymerization was terminated, the polymer slurry was heat-treated at 95° C. for 60 minutes. The polymer slurry was then dehydrated, washed with water, and dried at 80° C. for 20 hours to obtain a binder composition. The yield of the obtained polymer was 64%, the inherent viscosity $\eta_i$ was 1.78 dL/g, and the absorbance ratio $A_R$ was 0.58.

Production of Electrode Mixture

The production method of the electrode mixture was the same as the method in Example 1.

Production of Electrode

The electrode was produced by the same method as in Example 1.

Comparative Example 2

Preparation of Binder Composition

In an autoclave having a capacity of 2 L, 900 g of ion-exchanged water as a dispersion medium, 0.4 g of Metolose 90SH-100 (available from Shin-Etsu Chemical Co., Ltd.) as a cellulose-based suspending agent, 4.0 g of a 50 wt. % t-butyl peroxypivalate-HCFC-225cb solution as a polymerization initiator, 400 g of vinylidene fluoride, and 0.2 g of acryloyloxyethyl succinate as a monomer were charged, and the temperature thereof was increased to 50° C. over 2 hours.

Thereafter, while the temperature of 50° C. was maintained, 0.75 wt. % acryloyloxyethyl succinate aqueous solution was gradually added at the rate that makes the polymerization pressure constant. A total of 4.0 g of acryloyloxyethyl succinate was added, including the amount added initially. Polymerization was terminated at the same time when the addition of acryloyloxyethyl succinate aqueous solution was ended. The time took from the start of heating to the termination of the polymerization was 6.2 hours total.

After the polymerization was terminated, the polymer slurry was heat-treated at 95° C. for 60 minutes. The polymer slurry was then dehydrated, washed with water, and dried at 80° C. for 20 hours to obtain a binder composition. The yield of the obtained polymer was 70%, the inherent viscosity $\eta_i$ was 2.83 dL/g, and the absorbance ratio $A_R$ was 0.56.

Production of Electrode Mixture

The electrode mixture was produced by the same method as in Example 2.

Production of Electrode

The electrode was produced by the same method as in Example 1.

Number Average Molecular Weight Ratio Mn2/Mn1

In the present examples, the number average molecular weight ratio was estimated by the following method.

First, a 0.1 wt. % binder composition-NMP solution was prepared. While 5 g of this solution was sufficiently agitated, 0.8 g of AKP 3000 (high purity alumina, available from Sumitomo Chemical Co., Ltd.) was gradually added. After the addition of the AKP 3000, agitation was performed for 2.5 hours, and then the mixture was allowed to stand still overnight. The supernatant was collected and subjected to centrifugal separation. The supernatant after the centrifugal separation and the 0.1% binder composition-NMP solution before the alumina addition were subjected to GPC analysis to calculate each of the number average molecular weights. The number average molecular weight of the vinylidene fluoride copolymer composition before being added to the alumina was used as Mn1, and the number average molecular weight of the vinylidene fluoride copolymer composition that was not adsorbed onto the alumina after being added to the alumina was used as Mn2, and the number average molecular weight ratio, which was the ratio of Mn2 to Mn1, was then determined.

GPC Measurement Conditions

Solvent: 10 mM LiBr-NMP solution
Column: KD-806M×2
Measurement temperature: 40° C.
Flow rate: 1 mL/min
Detector: RI detector
Injection amount: 100 μL Peel Strength The electrode with one-side coating obtained in each of Examples 1 to 3 and Comparative Examples 1 to 3 was cut to the length of 100 mm and the width of 20 mm, and a 90 degree peeling test was conducted at a head speed of 10 mm/min in accordance with JIS K 6854-1 by using a tensile tester (STA-1150 Universal Testing Machine, available from Orientec Co., Ltd.) to evaluate the peel strength.

Volume Resistivity

The electrode with one-side coating obtained in each of Examples 1 to 3 and Comparative Examples 1 to 3 was cut to the length of 30 mm and the width of 30 mm, and an OPP tape was adhered to the coated face to peel off the aluminum foil, and this was used as a measurement sample. For the measurement, Loresta GP MCP-T610 (Mitsubishi Chemical Corporation) (probe: PSP (four-terminal method)) was used, and the volume resistivity was evaluated.

In Table 1, results of the inherent viscosity, the peel strength, the volume resistivity, and the number average molecular weight ratio of each of the examples and the comparative examples are shown.

TABLE 1

| Polymer | Inherent viscosity (dL/g) | Mixing Added amount of binder composition (part) | Mixing method | Peel strength (gf/mm) | Volume resistivity (Ω · cm) | Mn2/Mn1 |
|---|---|---|---|---|---|---|
| Example 1 | 1.87 | 2 | A | 0.84 | $1.0 \times 10^4$ | 0.81 |
| Comparative Example 1 | 1.77 | 2 | A | 1.06 | $8.4 \times 10^4$ | 1.06 |
| Example 2 | 2.50 | 1 | A | 0.49 | $1.7 \times 10^4$ | 0.87 |
| Comparative Example 2 | 2.83 | 1 | A | 0.52 | $1.1 \times 10^5$ | 1.11 |
| Example 3 | 2.50 | 2 | B | 5.24 | $1.7 \times 10^4$ | 0.87 |

INDUSTRIAL APPLICABILITY

According to the present invention, a binder composition having the excellent dispersibility of a conductive additive while sufficient adhesiveness to a metal foil is achieved can be obtained.

The invention claimed is:

1. An electrode mixture comprising a binder composition for binding an electrode active material to a current collector, an electrode active material, and a conductive additive,
wherein the binder composition comprises a vinylidene fluoride copolymer composition;
wherein the vinylidene fluoride copolymer composition comprises a copolymer of vinylidene fluoride and a monomer having an acidic functional group;
wherein the vinylidene fluoride copolymer composition has, in a case where the vinylidene fluoride copolymer composition is adsorbed onto alumina by adding 0.8 g of the alumina having a BET specific surface area of 4.5 m²/g to 5 g of an N-methyl-2-pyrrolidone solution containing the vinylidene fluoride copolymer composition at a concentration of 0.1 wt. %, a ratio (Mn2/Mn1) of less than 1, the ratio of a number average molecular weight of the vinylidene fluoride copolymer composition that is not adsorbed onto the alumina after the adsorption (Mn2) to a number average molecular weight of the vinylidene fluoride copolymer composition before the adsorption (Mn1).

2. The electrode mixture according to claim 1, wherein the acidic functional group is a carboxy group.

3. The electrode mixture according to claim 1, wherein the monomer having an acidic functional group is a compound represented by Formula (1) below:

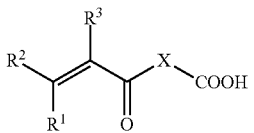

(1)

wherein, $R^1$, $R^2$, and $R^3$ are each independently a hydrogen atom, a fluorine atom, a chlorine atom, or an alkyl group having from 1 to 3 carbons, and X is an atomic group having a main chain formed from 1 to 10 atoms and having a molecular weight of 500 or less and includes at least one heteroatom selected from the group consisting of an oxygen atom and a nitrogen atom.

4. The electrode mixture according to claim 1, wherein the monomer having an acidic functional group is at least one type selected from the group consisting of 2-carboxyethyl acrylate, acryloyloxyethyl succinate, and acryloyloxypropyl succinate.

5. An electrode comprising a layer formed from the electrode mixture described in claim 1 on a current collector.

6. A non-aqueous electrolyte secondary battery comprising the electrode described in claim 5.

* * * * *